United States Patent
Kim et al.

(10) Patent No.: US 9,914,427 B1
(45) Date of Patent: Mar. 13, 2018

(54) HOOD HINGE APPARATUS FOR VEHICLE

(71) Applicants: Hyundai Motor Company, Seoul (KR); Kia Motors Corporation, Seoul (KR); Pyeong Hwa Automotive Co., Ltd., Daegu (KR)

(72) Inventors: Sang Il Kim, Hwaseong-si (KR); Seung Wan Kim, Suwon-si (KR)

(73) Assignees: Hyundai Motor Company, Seoul (KR); Kia Motors Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 0 days.

(21) Appl. No.: 15/499,090

(22) Filed: Apr. 27, 2017

(30) Foreign Application Priority Data

Dec. 8, 2016 (KR) .................. 10-2016-0166344

(51) Int. Cl.
*B60R 21/34* (2011.01)
*E05D 3/02* (2006.01)
*E05D 5/02* (2006.01)
*E05D 7/00* (2006.01)

(52) U.S. Cl.
CPC ............ *B60R 21/34* (2013.01); *E05D 3/02* (2013.01); *E05D 5/02* (2013.01); *E05D 7/00* (2013.01); *B60R 2021/343* (2013.01); *E05Y 2900/536* (2013.01)

(58) Field of Classification Search
CPC ..... B60R 21/34; B60R 2021/343; E05D 7/00; E05D 3/02; E05D 5/02; E05Y 2900/536
See application file for complete search history.

(56) References Cited

U.S. PATENT DOCUMENTS

| 3,643,755 | A * | 2/1972 | Gionet | E05D 3/125 16/222 |
| 7,690,465 | B2 * | 4/2010 | Hirata | B60R 21/34 180/69.2 |
| 7,934,293 | B2 * | 5/2011 | Kalargeros | B60R 21/38 16/357 |
| 8,069,943 | B2 * | 12/2011 | Takahashi | B62D 25/12 180/274 |
| 2007/0187993 | A1 * | 8/2007 | Kalargeros | B60R 21/38 296/193.11 |

FOREIGN PATENT DOCUMENTS

| DE | 10043931 A1 * | 4/2002 | ............ B60R 21/34 |
| JP | 2004203379 A * | 7/2004 | ............ B60R 21/38 |

* cited by examiner

*Primary Examiner* — Faye M Fleming
(74) *Attorney, Agent, or Firm* — Morgan, Lewis & Bockius LLP

(57) ABSTRACT

A hood hinge apparatus for a vehicle may include a bracket fastened to a vehicle body, an arm having a front end portion fastened to a hood, a rear end portion formed with a slot, and an arch portion formed to be concave downwards between the front end portion and the rear end portion, a link pressed against one surface of the arm having the slot, a hinge pin serving as a hinge point of rotation of the arm, and fastened to the bracket through the slot from an upper end portion of the link, and a pop rivet fastened between a lower end portion of the link and the rear end portion of the arm.

5 Claims, 3 Drawing Sheets

HOOD HINGE APPARATUS FOR VEHICLE

CROSS-REFERENCE TO RELATED APPLICATION

The present application claims priority to Korean Patent Application No. 10-2016-0166344 filed on Dec. 8, 2016, the entire contents of which are incorporated herein for all purposes by this reference.

BACKGROUND OF THE INVENTION

Field of the Invention

The present invention relates to a hood hinge apparatus for a vehicle. More particularly, it relates to a front swing type shock-absorbing hood hinge apparatus capable of absorbing shocks when a pedestrian or the like collides with a hood.

Description of Related Art

As well known in the art, a vehicle hood is rotatably mounted to a vehicle body through a hinge assembly in order to open and close an engine compartment, and the hinge assembly has a structure in which multiple links are combined in consideration of the weight and strength of the hood.

When a pedestrian collides with the hood, the pedestrian is shocked by falling on the hood and is simultaneously injured due to the collision between the pedestrian head and the hood.

Accordingly, to cope with pedestrian protection regulations and improve vehicle marketability, there is adopted an active hood system capable of reducing an injury to the head of a pedestrian by popping a hood up when the pedestrian collides with the hood. However, due to an increase in the cost and weight of the active hood system, it is necessary to develop other systems for protecting pedestrians.

For the present reason, instead of the active hood system that pops the hood up when the pedestrian collides with the hood, there is developed a passive hood system that reduces an injury to a pedestrian by lowering a hood down. However, the passive hood system may malfunction due to the lack of parts for detecting shocks and may cause an increase in weight.

In addition, the passive hood system has a disadvantage in terms of layout and results in an increase in manufacturing costs due to the application of complicated mechanisms in which the entirety of a hinge assembly is lowered upon collision.

The information disclosed in this Background of the Invention section is only for enhancement of understanding of the general background of the invention and should not be taken as an acknowledgement or any form of suggestion that this information forms the related art already known to a person skilled in the art.

BRIEF SUMMARY

Various aspects of the present invention are directed to providing a hood hinge apparatus for a vehicle, which includes a pop rivet applied around the hinge point of rotation of a hood, to absorb shocks when a pedestrian collides with the hood by breaking the pop rivet and simultaneously swinging the front end of the hood in a downward direction.

In an exemplary embodiment, a hood hinge apparatus for a vehicle includes a bracket fastened to a vehicle body, an arm having a front end fastened to a hood, a rear end formed with a slot, and an arch portion formed to be concave downwards between the front end and the rear end, a link pressed against one surface of the arm having the slot, a hinge pin serving as a hinge point of rotation of the arm, and fastened to the bracket through the slot from an upper end of the link, and a pop rivet fastened between a lower end of the link and the rear end of the arm.

The bracket may include a support end formed integrally at a lower portion thereof, the support end being configured to support the arch portion of the arm transported downwards to break the pop rivet.

The arch portion of the arm may be vertically spaced apart from the support end of the bracket in a normal state in which there is no collision with the hood.

The pop rivet may be broken when the front end of the arm rotates downwards (angular rotation) and the arch portion of the arm is simultaneously supported by the support end in the event of collision with the hood.

After the pop rivet is broken, the front end of the arm may further rotate downwards (angular rotation) and at the same time the rear end of the arm may further rotate upwards (angular rotation) by a distance at which the hinge pin is transported to a lower end of the slot.

Various aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set for in more detail in the accompanying drawings, which are incorporated herein, and the following Detailed Description, which together server to explain certain principles of the present invention.

Figure 1:
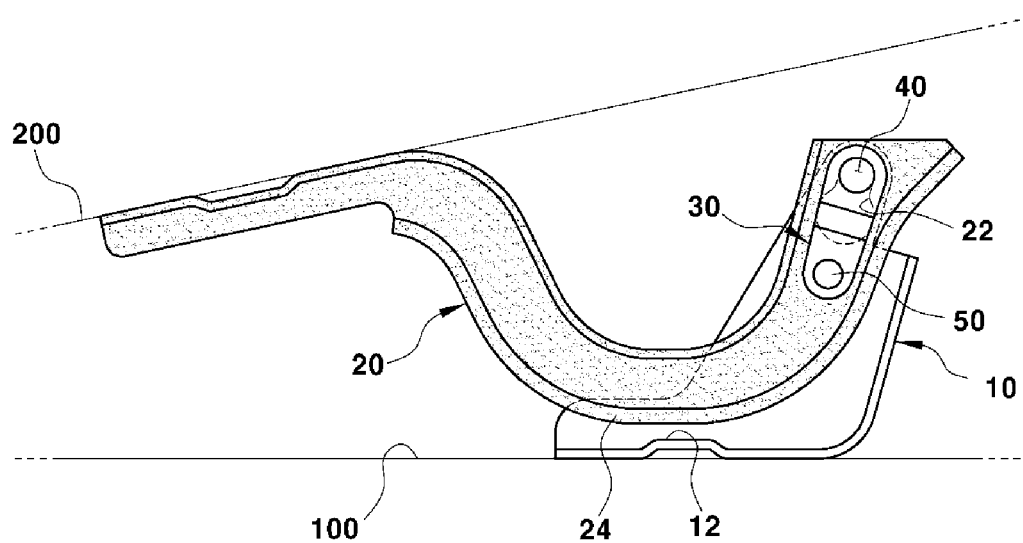
FIG. 1 is a side view illustrating a hood hinge apparatus for a vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is a side view illustrating a hood hinge apparatus for a vehicle according to an exemplary embodiment of the present invention. In FIG. 1, reference numeral 10 refers to a bracket which is fixedly mounted to a vehicle body 100.

The bracket 10 is fixedly mounted to the surface of the vehicle body 100 around an engine compartment, and is configured to provide a hinge point for opening or closing a hood 200.

An arm 20 configured for guiding the opening or closing of the hood is rotatably connected to the bracket 10.

The arm 20 is mounted to the hinge point for opening or closing of the hood, and guides the opening or closing of the hood by rotating in the same trajectory as the hood when the hood is opened or closed.

To the present end, the arm 20 has a front end portion which is fastened to the hood 200 and has a rectilinear bar shape, and a rear end portion which is vertically formed with a slot 22. The arm 20 has an arch portion 24 which is concave downwards between the front and rear end portions of the arm.

A link 30 having a predetermined length is vertically disposed on and fastened to one surface of the arm 20 having the slot 22.

To mount the arm 20 by a hinge, namely, to provide the hinge point of rotation of the arm 20, a hinge pin 40 is fastened to the bracket 10 through the slot 22 of the arm 20 from the upper end portion of the link 30.

In the present case, the hinge pin 40 is inserted into the upper portion of the slot 22 of the arm 20.

Thus, the arm 20 is rotatable about the hinge pin 40, and the hood 200 coupled to the front end portion of the arm 20 is also rotatable (angular rotation) together with the arm 20 to be opened or closed.

In addition, a pop rivet 50 is fastened between the lower end portion of the link 30 and the rear end portion of the arm 20.

In more detail, the lower end portion of the link 30 is integrally connected to the lower portion of the slot 22 of the arm 20 by the pop rivet 50.

Bracket 10 has a support end portion 12 which is integrally formed at the lower portion thereof and the support end portion 12 protrudes from the bracket 10. The support end portion 12 is configured to support the arch portion 24 of the arm 20 transported downwards to break the pop rivet 50.

Hereinafter, the operation flow of the hood hinge apparatus having the above structure according to the exemplary embodiment of the present invention will be described.

[Normal State (Before Hood Collision)]

Figure 2:
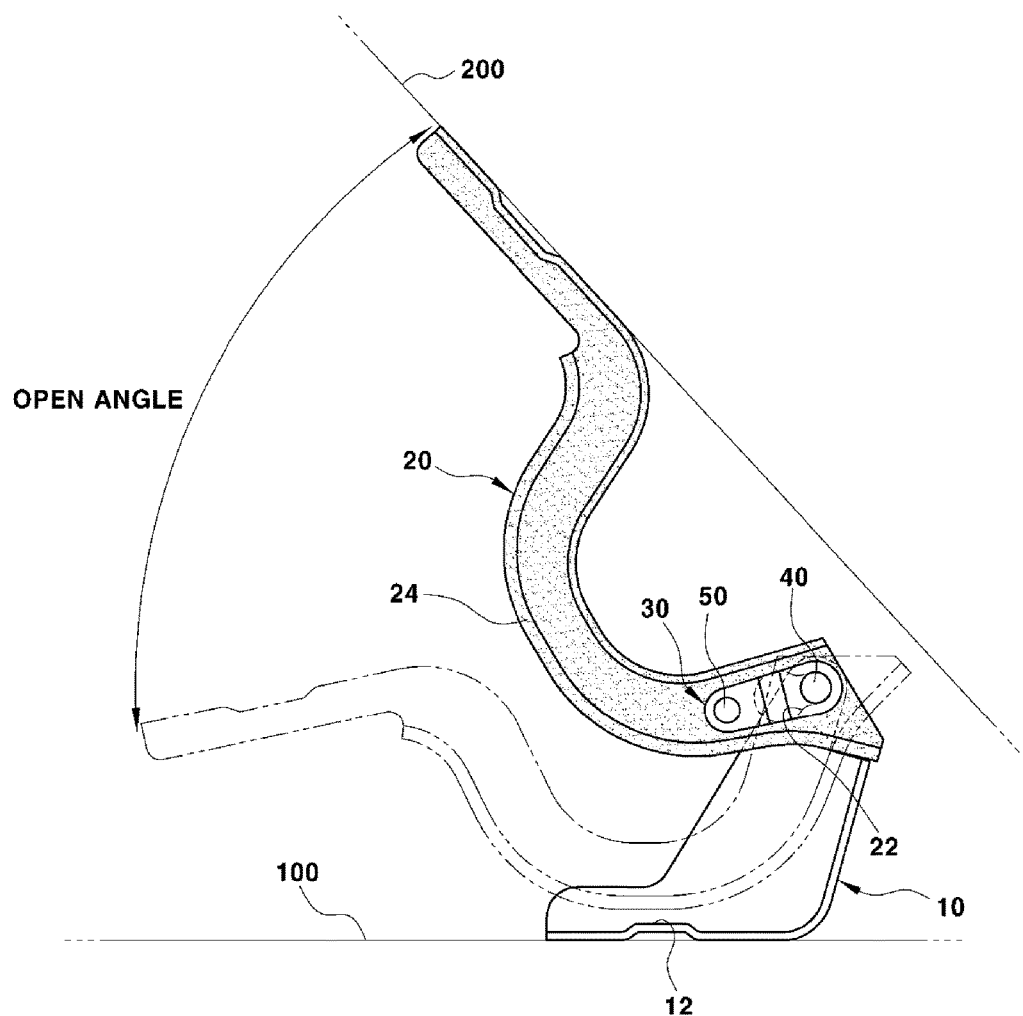
FIG. 2 is a side view illustrating the operation flow of the hood hinge apparatus for a vehicle according to the exemplary embodiment of the present invention when a hood is opened or closed.

FIG. 2 is a side view illustrating the operation flow of the hood hinge apparatus for a vehicle according to the exemplary embodiment of the present invention when the hood is opened or closed.

Since the front end portion of the arm 20 is coupled to the hood 200, namely since the hood 200 holds the front end portion of the arm 20, the arch portion 24 of the arm 20 is maintained in the state in which it is vertically spaced apart from the support end portion 12 of the bracket 10 even though the hood 200 is closed.

In addition, the arm 20 is rotatable (angular rotation) about the hinge pin 40, the hood 200 coupled to the front end portion of the arm 20 is also rotatable together with the arm 20, and the hinge pin 40 is inserted into the upper portion of the slot 22 of the arm 20.

In such a normal state, when the hood 200 is lifted up to be opened as illustrated in FIG. 2, the arm 20 rotates upwards (angular rotation) about the hinge pin 40 and the hood 200 coupled to the front end portion of the arm 20 simultaneously rotates together with the arm 20. As a result, the hood 200 is easily opened.

[Hood Collision State]

Figure 3:
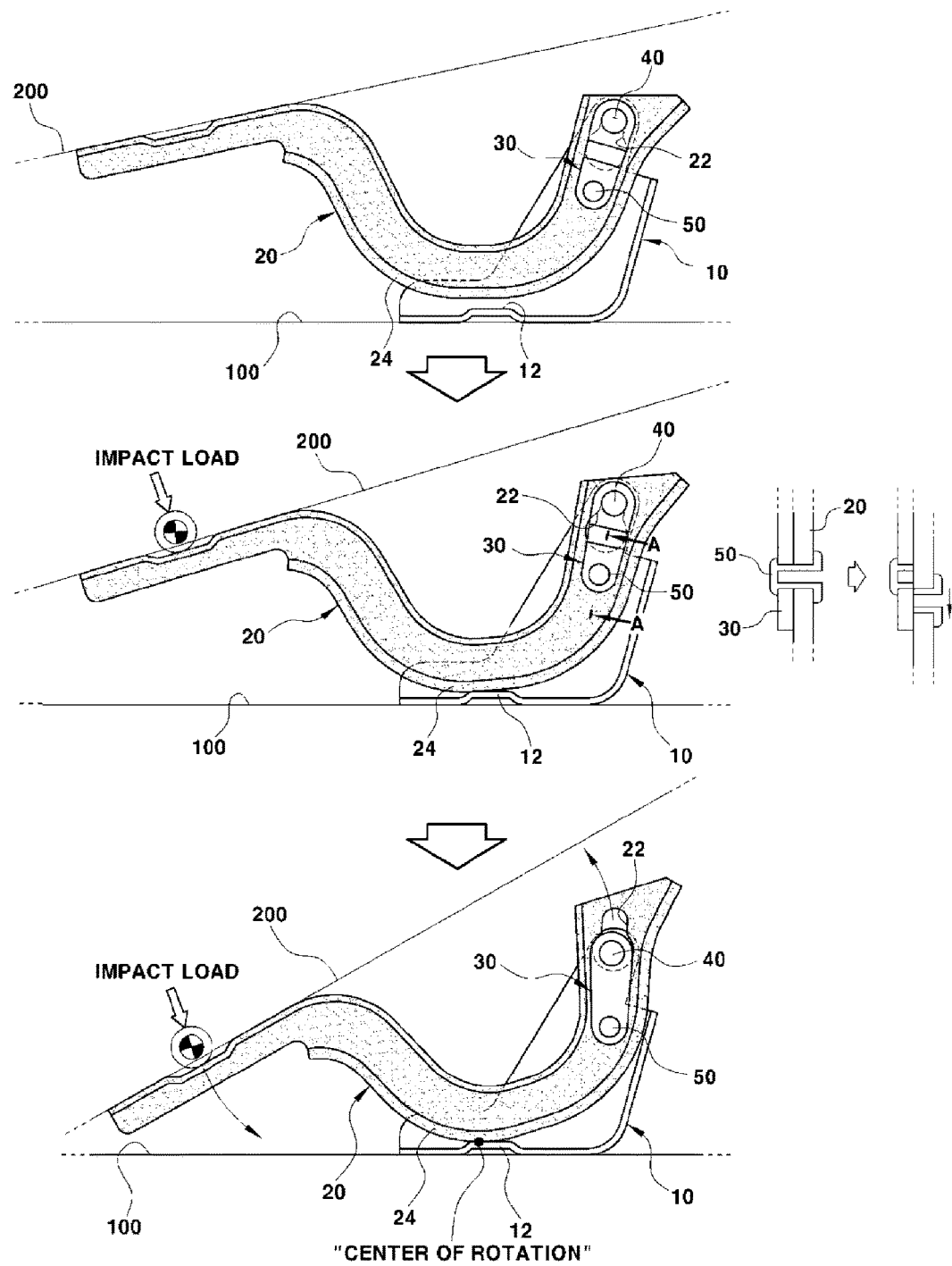
FIG. 3 is a side view illustrating the operation flow of the hood hinge apparatus for a vehicle according to the exemplary embodiment of the present invention during the collision of the hood.

FIG. 3 is a side view illustrating the operation flow of the hood hinge apparatus for a vehicle according to the exemplary embodiment of the present invention during the collision of the hood.

In a hood collision state in which a pedestrian's body (e.g. a head) collides with the hood 200, the front end portion of the hood 200 is swung around the hinge point and transported downwards to absorb the shocks applied to the pedestrian.

To absorb the shocks applied to the pedestrian, the impact due to the collision with the pedestrian is applied to the hood 200 and is simultaneously transferred to the arm 20.

Subsequently, the front end portion of the arm 20 rotates downwards about the hinge pin 40, together with the hood 200, and the arch portion 24 of the arm 20 is simultaneously supported by the support end portion 12 of the bracket 10.

In more detail, the front end portion and arch portions 24 of the arm 20 are moved downwards from the lowermost position thereof in the normal state due to the impact applied to the hood 200, causing the arch portion 24 of the arm 20 to come into contact with and be supported by the support end portion 12 of the bracket 10.

In the present case, when the arm 20 is moved downwards from the lowermost position thereof in the normal state, together with the hood 200, due to the impact applied to the hood 200, the shocks applied to the pedestrian are primarily absorbed.

When the front end portion of the arm 20 is rotated and transported downwards and the arch portion 24 of the arm 20 is supported by the support end portion 12 of the bracket 10 during the collision of the hood, the pop rivet 50 is broken.

In more detail, when the front end portion and arch portion 24 of the arm 20 rotate about the hinge pin 40 and are transported downwards from the lowermost position thereof in the normal state due to the impact applied to the hood 200, the pop rivet 50 is broken by shear force transferred thereto from the arm 20.

Next, immediately after the pop rivet 50 is broken, the front end portion of the arm 20 further rotates downwards (angular rotation) about the point, at which the arch portion 24 of the arm 20 comes into contact with and is supported by the support end portion 12 of the bracket 10, and the rear end portion of the arm 20 simultaneously rotates upwards (angular rotation) about the point. Consequently, the shocks applied to the pedestrian are secondarily absorbed.

In the present case, the hinge pin 40 is transported downwards from the upper portion of the slot 22.

Accordingly, immediately after the pop rivet 50 is broken, the distance that the front end portion of the arm 20 is further rotated and transported downwards, and the distance that the rear end portion of the arm 20 is further rotated and transported upwards are limited as the distance that the hinge pin 40 is transported downward from the upper portion of the slot 22.

As described above, since the pop rivet 50 is applied around the hinge point of rotation of the hood, it is possible to easily absorb shocks when the pedestrian collides with the hood by breaking the pop rivet 50 and simultaneously swinging the front end portion of the hood 200 in the downward direction. Thus, it is possible to reduce an injury to the pedestrian.

As is apparent from the above description, the present invention has the following effects.

Firstly, since the hood hinge apparatus for a vehicle according to the exemplary embodiment of the present invention includes a pop rivet applied around the hinge point of rotation of a hood, it is possible to easily absorb shocks when a pedestrian collides with a hood by breaking the pop rivet and simultaneously swinging the front end portion of the hood in a downward direction. Thus, it is possible to reduce an injury to the pedestrian.

Secondly, since the hood hinge apparatus has a simple structure compared with the hinge assembly applied to an existing passive hood system, the hood hinge apparatus can have an advantage in terms of layout for securing installation space and achieve a reduction in manufacturing costs and weight.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hood hinge apparatus for a vehicle, comprising:
    a bracket fastened to a vehicle body;
    an arm having a front end portion fastened to a hood, a rear end portion formed with a slot, and an arch portion formed to be concave downwards between the front end portion and the rear end portion;
    a link pressed against a first surface of the arm having the slot;
    a hinge pin serving as a hinge point of rotation of the arm, and fastened to the bracket through the slot from an upper end portion of the link; and
    a pop rivet fastened between a lower end portion of the link and the rear end portion of the arm.

2. The hood hinge apparatus of claim 1, wherein the bracket has a support end portion formed integrally at a lower portion thereof, the support end portion being configured to support the arch portion of the arm transported downwards to break the pop rivet.

3. The hood hinge apparatus of claim 2, wherein the arch portion of the arm is vertically spaced apart from the support end portion of the bracket in a normal state in which there is no collision with the hood.

4. The hood hinge apparatus of claim 2, wherein the pop rivet is broken when the front end portion of the arm rotates downwards and the arch portion of the arm is simultaneously supported by the support end portion upon collision with the hood.

5. The hood hinge apparatus of claim 1, wherein after the pop rivet is broken, the front end portion of the arm further rotates downwards and at the same time the rear end portion of the arm further rotates upwards by a distance that the hinge pin is transported to a lower end portion of the slot.

* * * * *